(12) United States Patent
Mears

(10) Patent No.: US 9,273,705 B2
(45) Date of Patent: Mar. 1, 2016

(54) AIRCRAFT HYDRAULIC SYSTEM

(71) Applicant: GE Aviation Systems LLC, Grand Rapids, MI (US)

(72) Inventor: John S Mears, Cincinnati, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 335 days.

(21) Appl. No.: 14/038,911

(22) Filed: Sep. 27, 2013

(65) Prior Publication Data

US 2015/0089936 A1    Apr. 2, 2015

(51) Int. Cl.
*F15B 21/04*  (2006.01)
*B64C 13/36*  (2006.01)

(52) U.S. Cl.
CPC ............... *F15B 21/041* (2013.01); *B64C 13/36* (2013.01)

(58) Field of Classification Search
CPC ............................... F15B 21/041; B64C 13/36
USPC ............................................ 60/453; 244/99.6
See application file for complete search history.

(56) References Cited

U.S. PATENT DOCUMENTS

| | | | | |
|---|---|---|---|---|
| 2,695,711 A | * | 11/1954 | Allan | B01D 35/153 210/133 |
| 4,428,196 A | * | 1/1984 | Boehringer | F15B 20/004 244/99.6 |
| 5,109,672 A | * | 5/1992 | Chenoweth | B64C 13/40 244/99.6 |
| 5,317,872 A | * | 6/1994 | Ingvast | F15B 21/042 60/453 |
| 5,744,034 A | * | 4/1998 | Clapham | F15B 21/041 210/108 |
| 8,484,962 B2 | * | 7/2013 | Behr | B64C 13/40 244/99.5 |

FOREIGN PATENT DOCUMENTS

| | | |
|---|---|---|
| EP | 2727831 A1 | 5/2014 |
| SU | 812314 A1 | 3/1981 |

OTHER PUBLICATIONS

Combined Search and Examination Report issued in connection with corresponding GB Application No. GB1416561.7 dated Mar. 9, 2015.

* cited by examiner

*Primary Examiner* — Thomas E Lazo
(74) *Attorney, Agent, or Firm* — GE Global Patent Operation; William S. Munnerlyn

(57) ABSTRACT

An aircraft hydraulic system for operating a plurality of hydraulically-operated actuators in the aircraft having a hydraulic reservoir in which hydraulic fluid is stored, a hydraulic distribution system coupling the hydraulic reservoir to the actuators and having a main flow line coupled to the hydraulic reservoir, a hydraulic pump fluidly coupled to the main flow line and the hydraulic reservoir to pump hydraulic fluid from the reservoir to the main flow line, a main filtration system fluidly coupled to the main flow line upstream of at least some of the actuators, and a self-cleaning filter fluidly coupled upstream of the main filtration system.

13 Claims, 5 Drawing Sheets

AIRCRAFT HYDRAULIC SYSTEM

BACKGROUND OF THE INVENTION

Contemporary aircraft may include a hydraulic system for operating or actuating moveable components in the aircraft such as landing gear, brakes, etc. The hydraulic fluid may become contaminated during use and need to be filtered. Thus, filter systems, such as replaceable media filters, may be included in the aircraft to filter contaminates therefrom; such contemporary aircraft hydraulic filter systems are costly and require routine service to replace or clean the filter.

BRIEF DESCRIPTION OF THE INVENTION

In one embodiment, the invention relates to an aircraft hydraulic system for operating a plurality of hydraulically-operated actuators in the aircraft having a hydraulic reservoir in which hydraulic fluid is stored, a hydraulic distribution system coupling the hydraulic reservoir to the actuators and having a main flow line coupled to the hydraulic reservoir, a hydraulic pump fluidly coupled to the main flow line and the hydraulic reservoir to pump hydraulic fluid from the reservoir to the main flow line, a main filtration system fluidly coupled to the main flow line upstream of at least some of the actuators, and a self-cleaning filter fluidly coupled upstream of the main filtration system and having a body with main flow portion, coupled in-line to the main flow line, and a branch portion, with a branch filter located within the body to filter hydraulic fluid passing through the branch portion and oriented relative to the main flow portion such that hydraulic fluid flowing through the main flow portion cleans the branch filter.

DESCRIPTION OF EMBODIMENTS OF THE INVENTION

Figure 1:
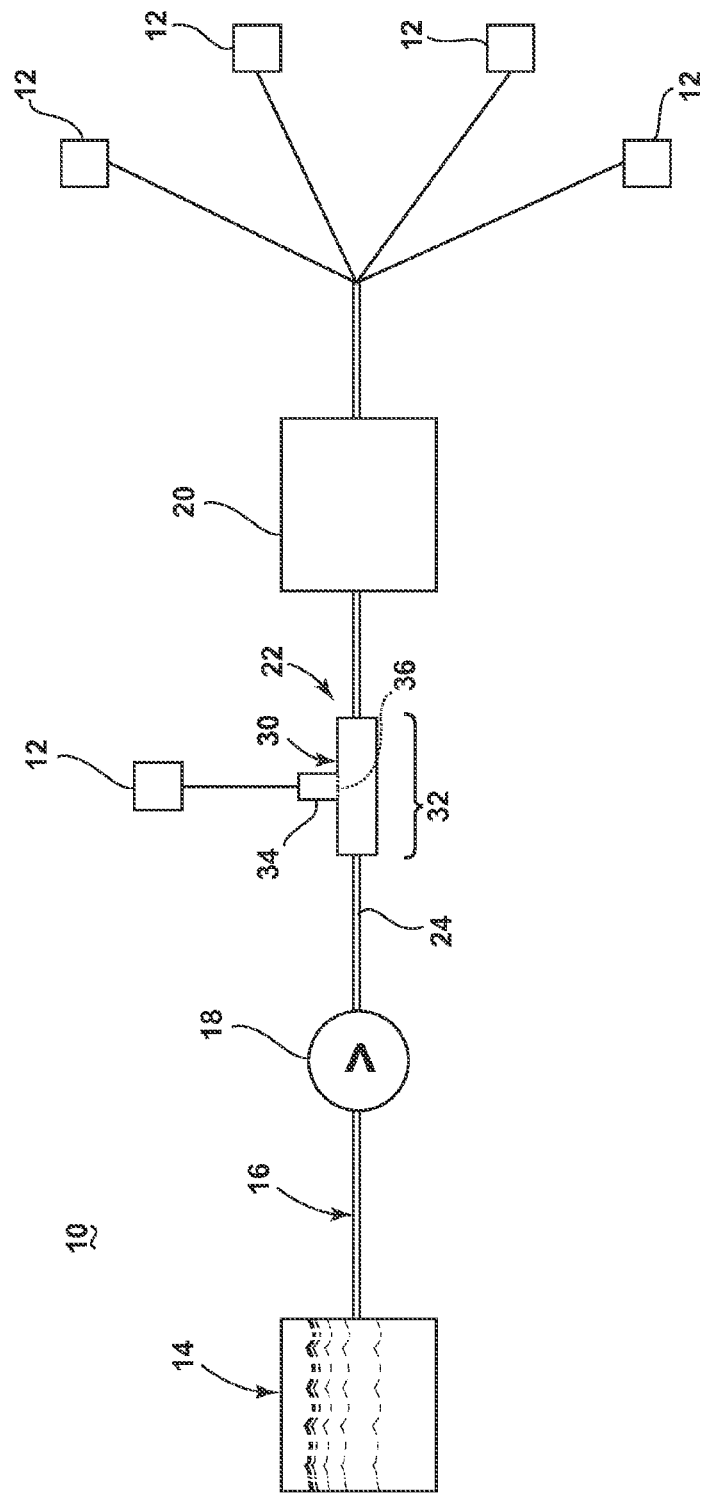
FIG. 1 is a schematic view of an aircraft hydraulic system.

FIG. 1 schematically illustrates an embodiment of an aircraft hydraulic system 10 for operating a plurality of hydraulically-operated actuators 12 and having a hydraulic reservoir 14, a hydraulic distribution system 16, a hydraulic pump 18, a main filtration system 20, and a self-cleaning filter 22. The hydraulic reservoir 14 may be any suitable receptacle in which hydraulic fluid may be stored. The hydraulic distribution system 16 may fluidly couple the hydraulic reservoir 14 to the actuators 12. The hydraulic distribution system 16 has been illustrated as including a main flow line 24 coupled to the hydraulic reservoir 14. The hydraulic pump 18 may be fluidly coupled to the main flow line 24 and the hydraulic reservoir 14 such that the hydraulic pump 18 may pump hydraulic fluid from the hydraulic reservoir 14 to the main flow line 24. The main filtration system 20 may be fluidly coupled to the main flow line 24 upstream of at least some of the actuators 12. Such a main filtration system 20 may include a replaceable media filter assembly.

The self-cleaning filter 22 fluidly couples upstream of the main filtration system 20. The self-cleaning filter 22 has been illustrated as a self-cleaning hydraulic branch filter that includes a body 30 with a main flow portion 32 and a branch portion 34. The main flow portion 32 is coupled in-line to the main flow line 24 and the branch portion 34 has been illustrated at a 90 degree angle from the main flow portion 32. A branch filter 36 may be located within the body 30 to filter hydraulic fluid passing through the branch portion 34. Further, the branch filter 36 may be oriented relative to the main flow portion 32 such that hydraulic fluid flowing through the main flow portion 32 cleans the branch filter 36.

Figure 2:
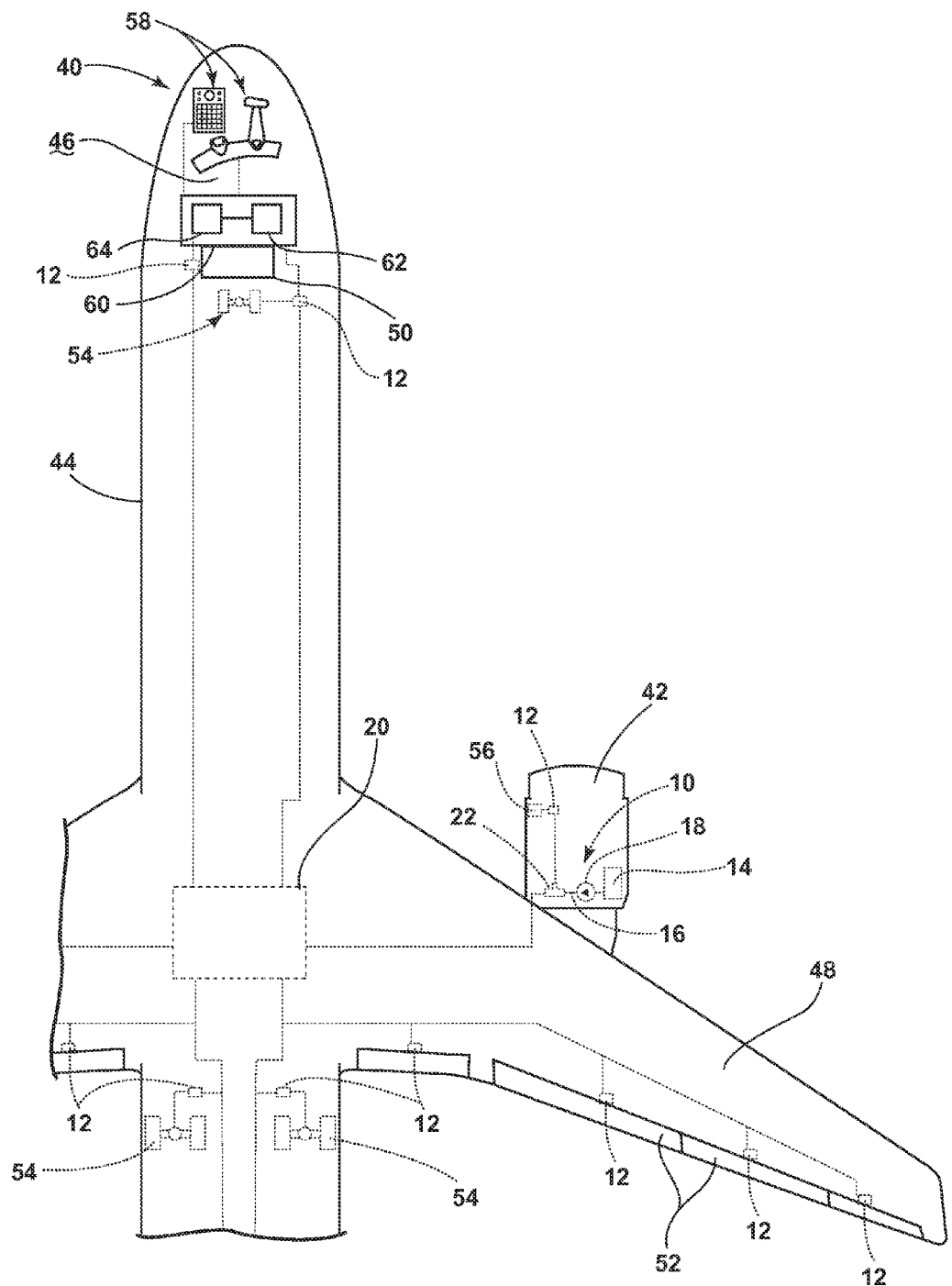
FIG. 2 is a schematic view of the aircraft hydraulic system of FIG. 1 within a portion of an aircraft.

The aircraft hydraulic system 10 and its components may be utilized in any suitable portion of an aircraft. FIG. 2 schematically depicts the aircraft hydraulic system 10 within an aircraft 40, a portion of which has been illustrated. It is contemplated that the aircraft hydraulic system 10 may be utilized in any aircraft 40, including one having one or more engine assemblies 42, a fuselage 44, a cockpit 46 positioned in the fuselage 44, and wing assemblies 48 extending outward from the fuselage 44. While only a portion of the aircraft 40, including a single engine assembly 42, has been illustrated it will be understood that any number of engine assemblies 42 may be included. Portions of the aircraft hydraulic system 10 have been illustrated as being included within the engine assembly 42 including the hydraulic reservoir 14, a portion of the hydraulic distribution system 16 including a line leading to a hydraulically-operated actuator 12 within the engine assembly 42, the hydraulic pump 18, and the self-cleaning filter 22. Other portions of the aircraft hydraulic system 10 including a portion of the hydraulic distribution system 16 including a variety of hydraulic lines leading to hydraulically-operated actuator 12 within various other portions of the aircraft and the main filtration system 20 are located within other portions of the aircraft 40. As illustrated, the main flow line 24 may lead from the hydraulic reservoir 14 off the engine assembly 42 to the main filtration system 20, which is located within the fuselage 44. In the illustrated example, the hydraulic pump 18 may be sized to pump anywhere from 10 to 100 gallons per minute and the main flow line 24 may be sized accordingly.

Multiple hydraulically-operated actuators 12 of the aircraft 40 have been illustrated. Examples of hydraulically-operated actuators 12 in the aircraft may include brakes 50, flaps 52, landing gear 54, thrust reversers 56, etc. A variety of control mechanisms 58 may be included in the cockpit 46 for actuation or operating such hydraulically-operated actuators 12. The control mechanisms 58 may be any suitable mechanisms.

A plurality of additional aircraft systems, not shown, that enable proper operation of the aircraft 40 may also be included in the aircraft 40 as well as a controller 60. The controller 60 may be operably coupled to the aircraft systems including the aircraft hydraulic system 10. For example, the hydraulic components 12, control mechanisms 58, and hydraulic pump 18 may be operably coupled to the controller 60. The controller 60 may also be connected with other controllers of the aircraft 40. While the controller 60 is illustrated as being located in the cockpit 46, the controller 60 may be located in other portions of the aircraft 40. The controller 60 may include memory 62 and one or more processors 64, which may be running any suitable programs.

While the aircraft 40 is being operated the variety of control mechanisms 58 may be utilized to set the position of the hydraulically-operated actuators 12. As certain systems are actuated, fluid is pumped from the hydraulic reservoir 14 to the hydraulically-operated actuators 12. By way of example, in the case of the flaps 52, hydraulic fluid may be pumped by the hydraulic pump 18 from the hydraulic reservoir 14, through the main filtration system 20, and then to the hydraulically-operated actuators 12 associated with the flaps 52. In the case of a thrust reverser 56, hydraulic fluid may be pumped by the hydraulic pump 18 from the hydraulic reservoir 14 through the self-cleaning filter 22 to the hydraulically-operated actuators 12 associated with the thrust reverser 56. As both the thrust reverser 56 and the hydraulic reservoir 14 are located on the engine assembly 42, the ability to pass the hydraulic fluid through the self-cleaning filter 22 without having to pass the hydraulic fluid through the main filtration system 20, which is located off of the engine assembly 42, is much more efficient.

Figure 3:
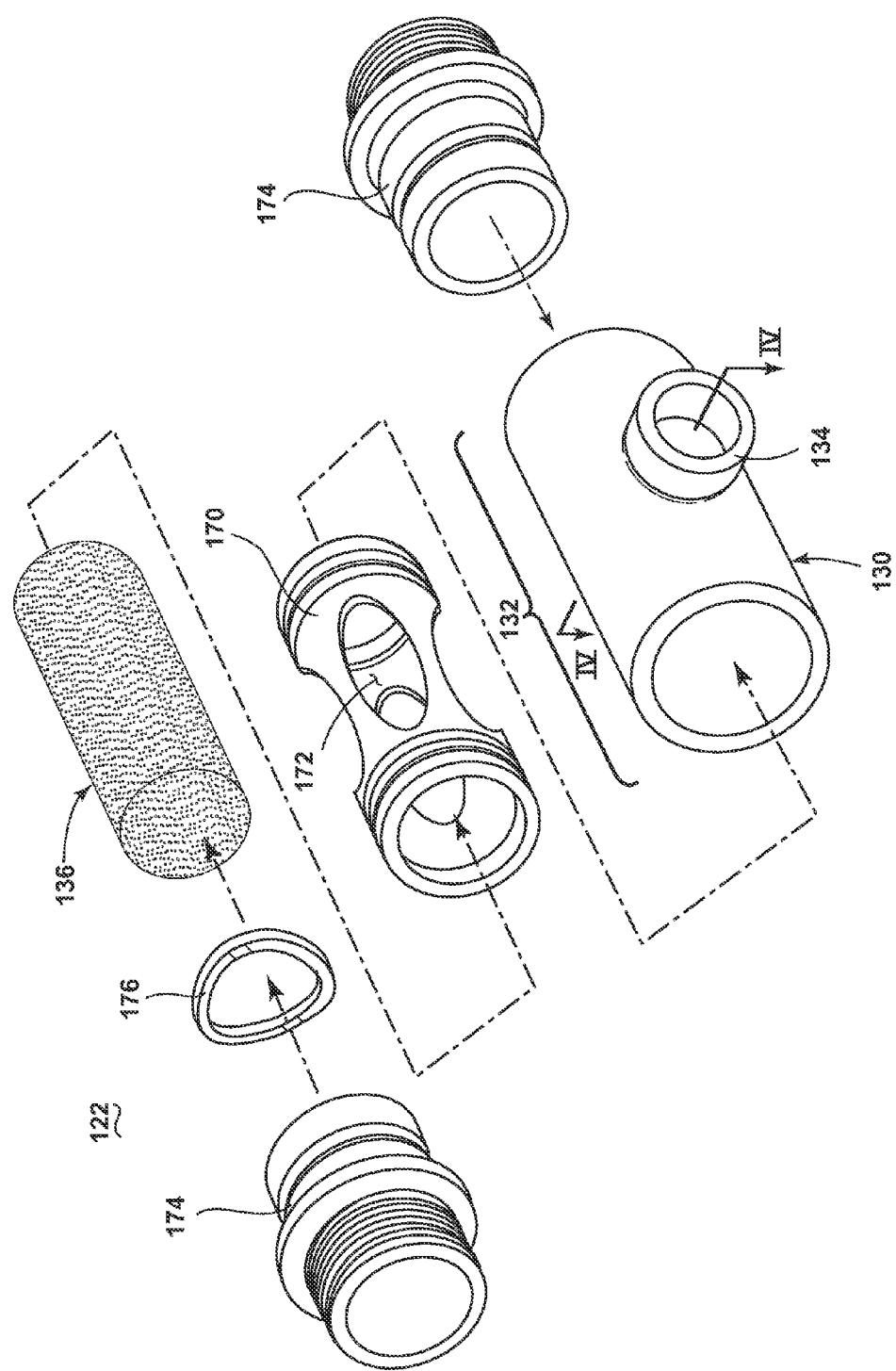
FIG. 3 is an exploded perspective view of an exemplary self-cleaning filter that may be used with the aircraft hydraulic system of FIGS. 1 and 2.

It will be understood that the self-cleaning filter may be formed in any suitable manner, for example FIG. 3 illustrates an exploded view of an exemplary self-cleaning filter 122, which is similar to the self-cleaning filter 22 previously described and therefore, like parts will be identified with like numerals increased by 100, with it being understood that the description of the like parts of the self-cleaning filter 22 applies to the self-cleaning filter 122, unless otherwise noted.

The self-cleaning filter body 130 of the self-cleaning filter 122 has been illustrated as a T-joint forming the main flow portion 132 and the branch portion 134. The branch portion 134 has been illustrated as being sized to be less than half the size of the main flow portion 132. The branch filter 136 of the self-cleaning filter 122 has been illustrated as a screen filter within the T-joint. While any suitable branch filter 136 may be utilized, the filter screen has been illustrated as a cylindrical screen. Such a screen filter may be a metal cylinder with laser drilled holes to improve the robustness and reliability of the branch filter 136 alternatively a mesh screen may be used. The screen filter may have an average pore size of 0.005 inches or less.

Further, the self-cleaning filter 122 has been illustrated as including additional parts including a housing 170 for the branch filter 136 having various openings 172, fittings 174, and a biasing element 176. FIG. 3 illustrates the self-cleaning filter 122 assembled and in cross section. As may more easily be seen, the housing 170 along with the biasing element 176 holds the branch filter 136 within the T-joint. The biasing element 176 may be any suitable type of biasing element including the illustrated spring type washer, which may limit potential movement of the screen. While only one biasing element 176 has been illustrated it will be understood that additional biasing elements 176 may be included to hold the branch filter 136 in place. The fittings 174 may include any suitable fitting that may be used to operably couple the self-cleaning filter 122 within the hydraulic distribution system 16. Ring lock fittings, not shown, may be used to couple the hydraulic lines to the fittings 174 or the self-cleaning filter 122 itself including the main portion 132 and the branch portion 134. The ring lock fittings may allow for reliable and simple installation into and connection with the hydraulic distribution system 16. Seals 178 may be included within portions of the self-cleaning filter 122 including within portions of the branch filter 136 so that hydraulic liquid is directed appropriately through portions of the self-cleaning filter 122.

As illustrated the branch filter 136 is substantially parallel to the flow direction of the hydraulic fluid through the main portion 132 and the branch filter 136 is orthogonal to an opening of the branch portion 134. During operation, the self-cleaning filter 122 uses the flow through the main portion 132 to clean contamination off of the branch filter 136, which is used to provide cross flow to the branch portion 134 and a hydraulically-operated actuator 12 fluidly coupled thereto. In this manner, the flow to a single hydraulic system, which is part of a larger hydraulic system, is delivered by the branch portion 134 and goes through the branch filter 136 at a 90 degree angle to the supply in the main portion 132. The supply flow goes through the main portion 132 and the middle of the screen filter and contains the larger part of the flow and carries off any contamination that was trapped by the screen filter.

Figure 4:
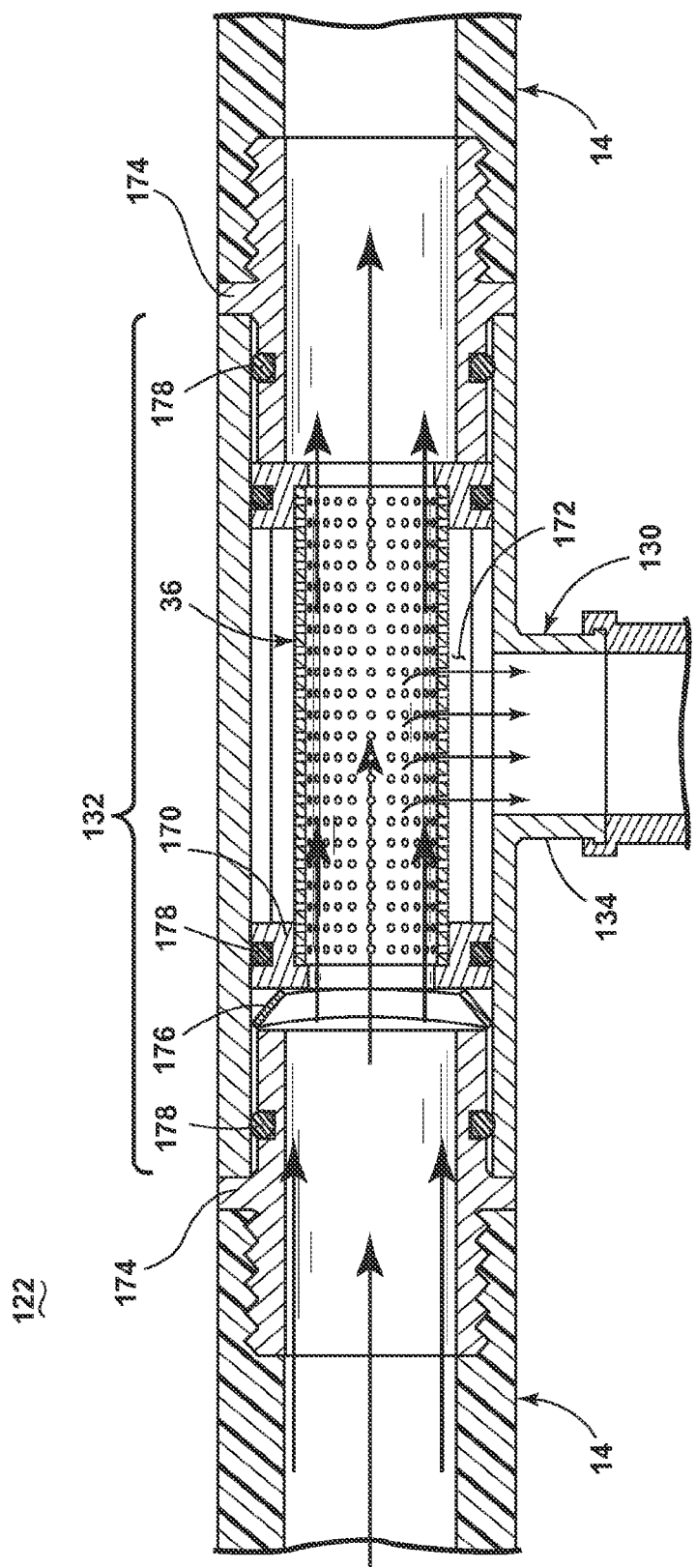
FIG. 4 is a cross-sectional view of the self-cleaning filter of FIG. 3.
Figure 5:
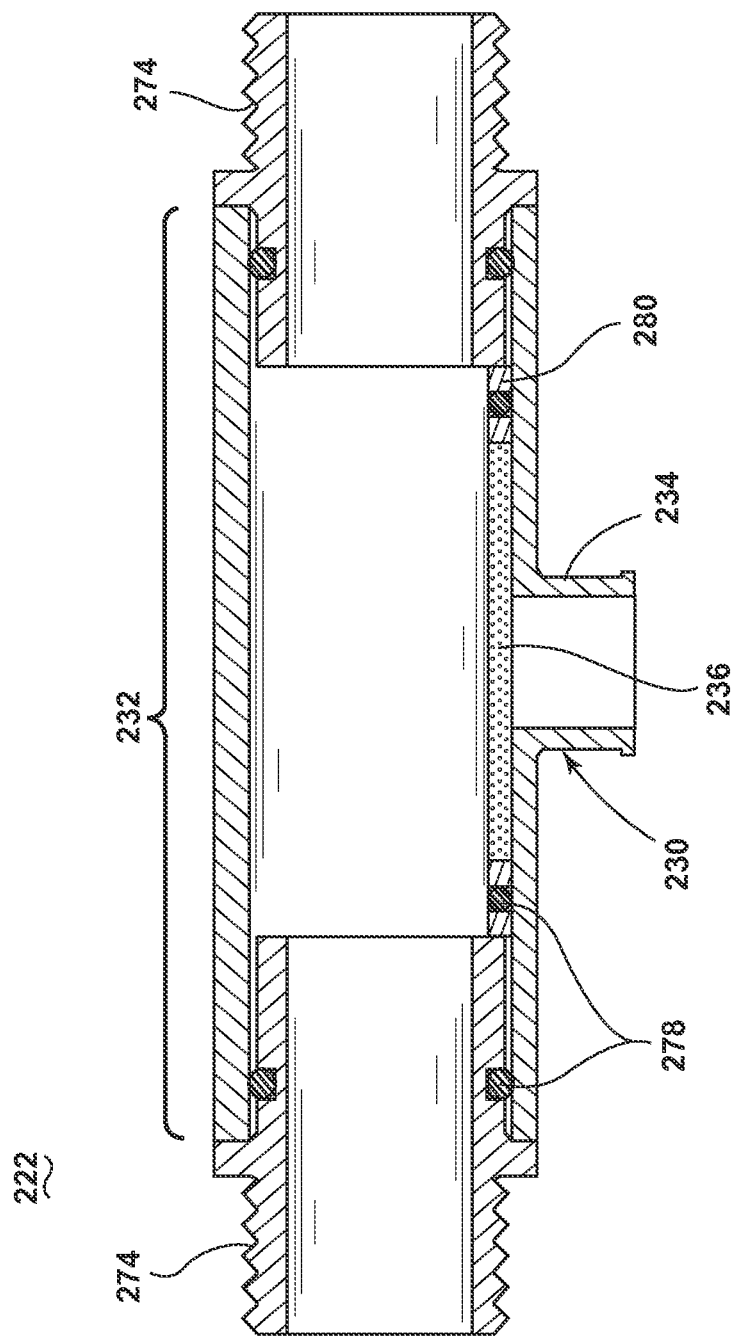
FIG. 5 is a cross-sectional view of another self-cleaning filter that may be used with the aircraft hydraulic system of FIGS. 1 and 2.

Further, FIG. 4 illustrates an alternative self-cleaning filter 222. The self-cleaning filter 222 is similar to the self-cleaning filter 22 and the self-cleaning filter 122 previously described and therefore, like parts will be identified with like numerals increased by 100, with it being understood that the description of the like parts of the self-cleaning filter 22 and the self-cleaning filter 122 applies to the self-cleaning filter 222, unless otherwise noted. One difference is that the branch filter 236 is not cylindrical and includes a frame 280 operably coupled to the branch filter 236. The branch filter 236 and frame 280 may be held in place by the fittings 274. Alternatively, the branch filter 236 itself may be wedged between the fittings 274 and no frame may be included.

In the illustrated example, the branch portion 234 is sized to be less than or equal to ¼ of the main flow portion 232. For example, the main flow portion 232 may have a one inch diameter and the branch portion 234 may have a 0.25 inch diameter. The self-cleaning filter 222 operates similarly to the self-cleaning filters described above including that the supply flow going through the main portion 232 may clean the branch filter 236.

The above described embodiments provide a variety of benefits including that a self-cleaning filter may be used to filter fluid on systems that are not currently getting filtered flow from the aircraft and may be installed directly into the hydraulic lines of a system. Further, the small size of the above described self-cleaning filters allow for easy installation and low cost compared to typical filter assemblies. Further, such self-cleaning or wash flow filters may eliminate a need for typical filter assemblies for smaller or sub-systems of larger hydraulic systems. Furthermore, the above described embodiments, with their self-cleaning nature eliminate the need to have a relief valve, delta pressure indication, and the need for removal, cleaning, or servicing of the filter element.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft hydraulic system for operating a plurality of hydraulically-operated actuators in the aircraft, comprising:
a hydraulic reservoir in which hydraulic fluid is stored;
a hydraulic distribution system coupling the hydraulic reservoir to the actuators and having a main flow line coupled to the hydraulic reservoir;
a hydraulic pump fluidly coupled to the main flow line and the hydraulic reservoir to pump hydraulic fluid from the hydraulic reservoir to the main flow line;
a main filtration system fluidly coupled to the main flow line upstream of at least some of the actuators; and
a self-cleaning filter fluidly coupled upstream of the main filtration system and having a body with a main flow portion, coupled in-line to the main flow line, and a branch portion, with a branch filter located within the body to filter hydraulic fluid passing through the branch portion and oriented relative to the main flow portion such that hydraulic fluid flowing through the main flow portion cleans the branch filter.

2. The aircraft hydraulic system of claim 1 wherein the branch portion is sized to be less than half the size of the main flow portion.

3. The aircraft hydraulic system of claim 2 wherein the branch portion is less than or equal to ¼ of the main flow portion.

4. The aircraft hydraulic system of claim 1 wherein the main flow portion has a one-inch diameter and the branch portion has a 0.25-inch diameter.

5. The aircraft hydraulic system of claim 1 wherein the hydraulic pump is sized to pump between 10 to 100 gallons per minute.

6. The aircraft hydraulic system of claim 1 wherein the self-cleaning filter body comprises a T-joint forming the main flow portion and the branch portion.

7. The aircraft hydraulic system of claim 6 wherein the branch filter of the self-cleaning filter comprises a screen within the T-joint.

8. The aircraft hydraulic system of claim 7 wherein at least one biasing element holds the screen within the T-joint.

9. The aircraft hydraulic system of claim 1 wherein the hydraulic distribution system comprises hydraulic lines for fluidly coupling portions of the aircraft hydraulic system.

10. The aircraft hydraulic system of claim 1 wherein the branch filter is substantially parallel to a flow direction of the hydraulic fluid through the main flow portion.

11. The aircraft hydraulic system of claim 1 wherein the branch filter is orthogonal to an opening of the branch portion.

12. The aircraft hydraulic system of claim 1 wherein the branch filter is a screen filter.

13. The aircraft hydraulic system of claim 1 wherein the screen filter has an average pore size of 0.005 inches or less.

* * * * *